May 22, 1928.
J. MAICKEL ET AL
1,670,896
DEMOUNTABLE DRILL BIT
Filed April 6, 1927
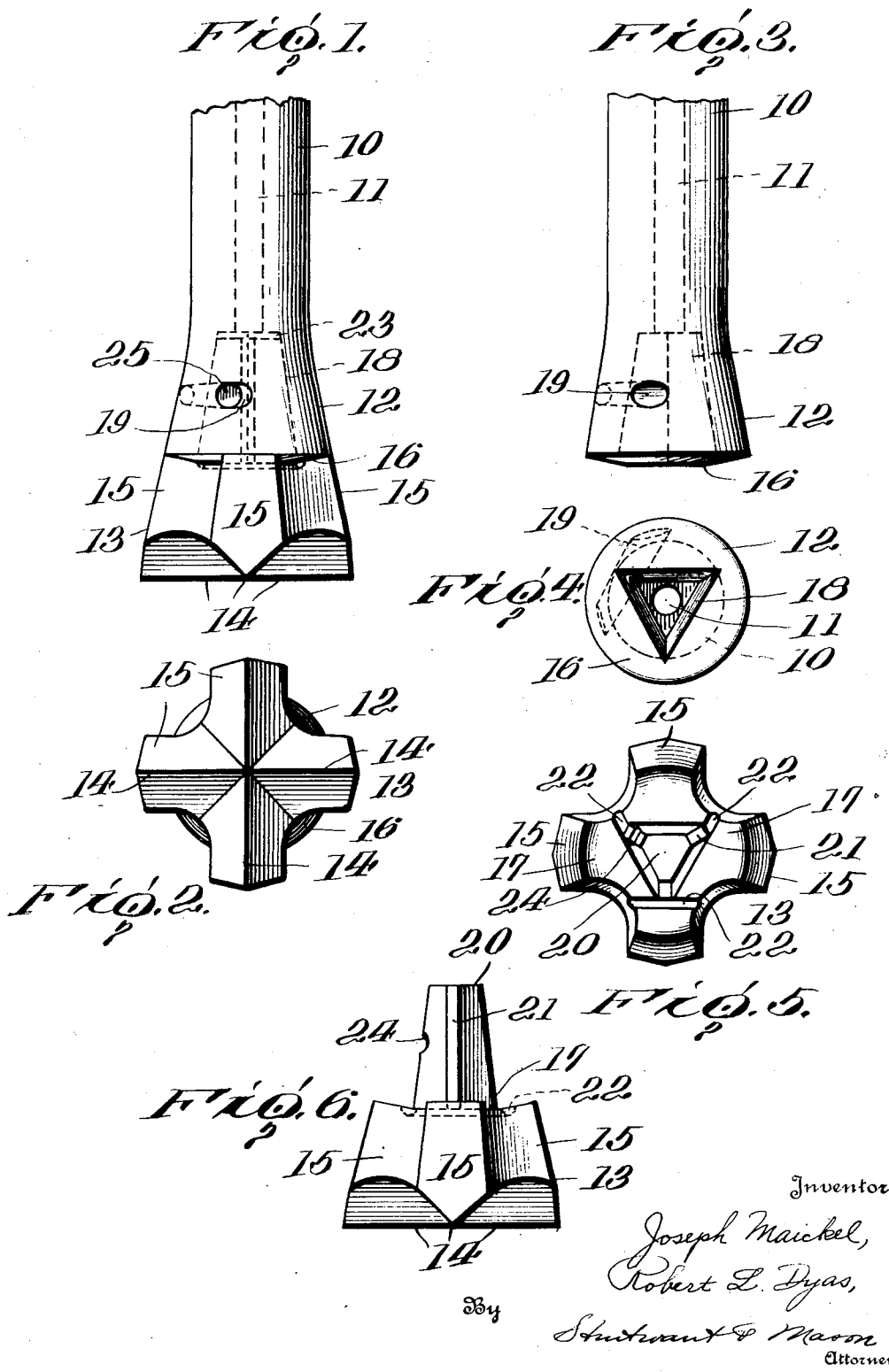

Patented May 22, 1928.

1,670,896

UNITED STATES PATENT OFFICE.

JOSEPH MAICKEL AND ROBERT L. DYAS, OF BUTTE, MONTANA, ASSIGNORS TO HAWKESWORTH DRILL COMPANY, OF BUTTE, MONTANA, A CORPORATION OF DELAWARE.

DEMOUNTABLE DRILL BIT.

Application filed April 6, 1927. Serial No. 181,512.

This invention relates to improvements in demountable drill bits, and more particularly relates to the method of assembling and alining such drill bits of the type to be employed in rock drills.

It has been found that the demountable drill bits heretofore in use are subject to several difficulties under severe service. One of these difficulties is the upsetting of the shank, whereby a bulging or rib formation occurs at the point of junction of the shank with the bit proper, which necessitates frequent dressing of the shank as well as of the bit. Another great difficulty is the tendency of the axis of the bit to become eccentric with respect to the axis of the shank, with a resultant imperfect and irregular drilling, thus requiring greater power and attention on the part of the mechanism and its operator.

The present invention eliminates these difficulties, and furthermore provides positive means to maintain the axis of the bit head and shank in positive alinement at all times, and decreases and substantially eliminates the upsetting tendency. This invention further provides simple and adequate means for furnishing water to the drill head.

In the accompanying drawings, which illustrate one example of execution of this invention, there is represented:

Figure 1 is a side view of the assembled bit head and shank.

Fig. 2 is an end view of the same from the front or cutting end.

Fig. 3 is a side elevation of the shank with the drill head removed.

Fig. 4 is a front end view of the same.

Fig. 5 is a rear end view of the bit head.

Fig. 6 is a side elevation of the bit head.

In these figures, the shank 10 is provided with a central water duct 11. It will be understood that this shank is made of any suitable length, which may vary with the particular purposes for which the assembly is intended, and according to the depth of the hole to be drilled. At its front end, being that adjacent the bit head proper, the end of the shank tapers outward to an enlarged portion 12.

The bit head 13 is provided with the usual star-shaped cutting surfaces 14, 14, as indicated clearly in Fig. 2. The head extends rearwardly in a general tapered or conical form so that the side surfaces 15 of the head join smoothly with the tapered portion 12 of the shank.

The front end of the shank 10 is furnished with a convex surface 16 which exactly mates the concave surface 17 (Fig. 6) on the drill head.

In the front end of the shank 10 is likewise provided an axial cavity 18 which is of irregular shape, preferably polygonal, and is represented on the drawings as being triangular. A tapered aperture 19 is formed through the enlarged portion 12 of the shank, at right angles to the axis, and intersecting the cavity 18. The cavity 18 constitutes a mortise for the reception of a tenon 20 formed integrally with the bit head 13.

This tenon 20 is likewise of irregular form which adapts it to mate with the cavity 18, and in the present instance this tenon 20 is substantially of triangular form. The corners, however, of this form have been cut away as indicated at 21 in Fig. 5 to furnish water conduits from the water duct 11 to the concave surface 17 of the drill head. These conduits lead to grooves 22 formed in the concave surface 17 of the drill head. The tenon 20 is shorter than its corresponding cavity 18, so that a chamber 23 is left as shown in Fig. 1. In this way, the water passing through the duct 11 enters the chamber 23 and flows down the conduits formed between the surface 21 and the walls of the cavity 18, and passes through the grooves 22 to the outer surface of the bit head 13.

A key notch 24 is formed in the side of the tenon 20 to correspond with the key aperture 19, and establish a clear passage through the bit shank and head when in correctly assembled position; a tapered key 25 is driven into this aperture to securely lock the head and shank together in their correctly assembled and alined position. It will be noted that even though the particular bit head 13 is inserted with its tenon 20 presented wrongly in the cavity 18 of the shank 10, in the event that the cavity 18 is a regular polygon, yet no difficulties will arise therefrom, since the retaining key 25 cannot be inserted to lock the elements together.

In operation, a number of the bit heads 13 are provided, all alike, and all capable of cooperation with the shank 10 or any shank similar in form. These bits are severally located and used, and as they are worn, they are removed and sharpened.

It will particularly be noted that under the strain of impact of the cutting surfaces 14 and their edges upon the rock, the reaction through the bit head 13 will come upon the concave surface 17 and be transmitted therefrom to the convex surface 16. The tendency of the mass of metal of the shank is therefore to be compressed and driven inwardly rather than outwardly, so that no upsetting or swelling of the shank occurs.

The invention is not limited to the specific form illustrated, but may be modified within the scope of the appended claims.

What is claimed as new is:

1. In a demountable drill bit, a head and a shank; said head having cutting faces formed thereon and being rearwardly tapered and having a rear surface for mating with the front end of the said shank, said head having a rearward axial tapered tenon of irregular cross-section with a transverse notch therein and a concave bearing surface around said tenon; said shank having a mortise of irregular section therein to receive the tenon whereby to aline said head and shank and retain them against relative rotation and a key aperture in alinement with the notch of said tenon; said shank having a convex bearing surface to rest against said concave surface of said head and a key in said aperture and notch to hold said tenon and head engaged with said shank.

2. In a demountable drill bit, a shank and a head; said shank having an axial water duct therethrough, and a tapered cavity of irregular section at its front end, the front face of said shank being convex; said head having a concave rear face to fit said convex face of the shank, and a tenon of irregular section to fit the cavity of said shank, said tenon being cut away to form passages between itself and said shank within said cavity in the direction of the axis of said bit, said concave face having grooves therein whereby water from said duct may pass to the exterior of said head; said shank having a key aperture therethrough, and said tenon having a notch in registry with said aperture in the assembled condition, and a key adapted to be seated in said aperture and notch to retain said head and shank together.

3. In a demountable drill bit, a head and a shank; said shank having a water duct therethrough and a cavity of truncated pyramidal shape communicating with said duct; said head having the cutting edges at its front and a surface at its rear to mate the front surface of the shank, said head also having a tenon extending rearwardly therefrom and adapted to be received in said cavity, said tenon being of lesser length than the cavity and being of similar truncated pyramidal form with portions cut away to provide water passages, said rear surface having grooves therein to establish water passages to the outer surface of said head.

4. In a demountable bit, a head and a shank; said shank having a tapered enlarged front end with a convex end surface, and having an axial cavity of irregular section at such front end; said head having a truncated conical surface in extension of said tapered front end and a concave rear surface to mate said convex surface; an integral tenon of irregular section extending axially rearward from said concave surface and adapted to be received in said cavity whereby to aline said head and shank, and means to secure said head and shank together.

In testimony whereof, we affix our signatures.

JOSEPH MAICKEL.
ROBERT L. DYAS.